Dec. 11, 1962 R. R. MOORE ETAL 3,068,404
TEST CELL CONTAINER FOR USE WITH APPARATUS FOR
MEASURING MOISTURE CONTENT OF MATERIALS
Filed Feb. 12, 1957
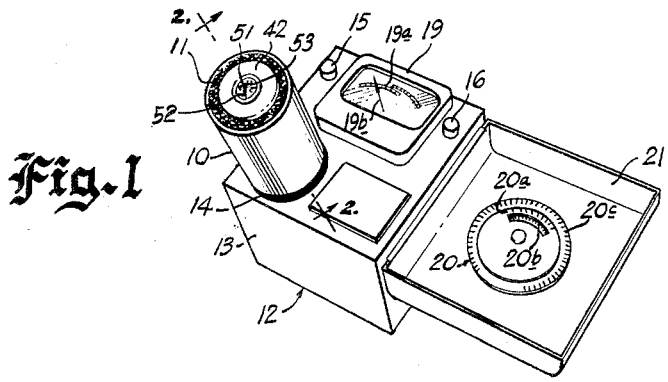
INVENTORS
Robert R. Moore &
BY Lester R. Rabb
Mason, Kolehmainen, Rathburn and Wyss.
Attorneys.

United States Patent Office 3,068,404
Patented Dec. 11, 1962

3,068,404
TEST CELL CONTAINER FOR USE WITH APPARATUS FOR MEASURING MOISTURE CONTENT OF MATERIALS
Robert R. Moore, Glenview, and Lester R. Rabb, Berwyn, Ill., assignors to Moore-Milford Corporation, Evanston, Ill., a corporation of Illinois
Filed Feb. 12, 1957, Ser. No. 639,731
5 Claims. (Cl. 324—65)

The present invention relates to the art of measuring moisture content of a material, and, more specifically, to a new and improved test cell container comprising a portion of apparatus adapted to determine the moisture content of a sample of material stored in the test cell container by simultaneous measurement of temperature and resistance of the sample.

It is well known that certain characteristics of a material vary with the relative amount of moisture contained therein. Accordingly, by suitable measurements of both the electrical and thermal properties of the material it is possible to obtain values which can be readily translated into relative moisture content. Various prior art devices have been proposed wherein a standardized vessel for storing a predetermined sample of material is selectively connected to suitable electrical apparatus to determine the resistivity, capacitance or conductance of the sample. Simultaneously, the temperature of the sample is obtained from a conventional thermometer disposed in thermal contact with a portion of the material, whereby by reference to a so-called calibrator the relative moisture content of the sample is readily determined by correlation of the indicated temperature measurement with indicated electrical measurement. A few of these and some other prior art devices, while measuring the relative moisture content of the sample with fair accuracy, have employed auxiliary attachments for partially disposing the thermometer in the sample stored in the vessel. In other devices the operator, while attempting to obtain electrical measurements, is required to manually dispose the thermometer within the material; in either case thermometer breakage is substantial and maintenance costs are increased. In addition, because of the temperature differential existing between the sample and the measuring apparatus or the atmospheric temperature surrounding the testing apparatus, the temperature of the sample continually changes during the measuring operation, until an ambient temperature is reached, whereby an error is introduced in the temperature readings with the result that the accuracy of the moisture content determination is reduced.

Moreover, several types of standardized vessels or test cell containers have been manufactured with attachments for either compressing the material to be tested to facilitate electrical measurements thereof or for supporting the test cell container in the electrical measuring apparatus. It would, therefore, be desirable to provide a compact, rugged, easily-operable test cell having no auxiliary attachments which is adapted to be used with electrical measuring apparatus embodying the resistance, capacitance or conductance method of measurement.

Accordingly, it is an object of the present invention to provide an apparatus for measuring the moisture content of materials and which obviates the above-described disadvantages.

It is also an object of the present invention to provide a simple test cell container usable by a skilled or unskilled operator with apparatus for measuring moisture content percentage of a material to obtain quickly and accurately electrical and thermal properties of the material indicative of its moisture content.

Still another object of the present invention is to provide a portable test cell container which may be rapidly loaded with material to be tested and which may be readily connected and disconnected to suitable electrical measuring instruments.

It is still another object of the present invention to provide a test cell container for maintaining at a substantially constant temperature during a measurement operation material stored in the container.

Still another object of the present invention is to provide a self-contained test cell container from which the temperature of material to be tested is obtained without the use of external thermometers or auxiliary equipment.

A further object is to provide a test cell which contains a relatively large sample which is representative of the test material, constructed of electrically and thermally conductive material.

Another object of the present invention is to provide a test cell container wherein a material to be tested and the container are brought quickly to and maintained at an equilibrium temperature prior to and during a testing operation.

Further objects and advantages of the present invention will become apparent as the following description proceeds, and the features of novelty which characterize the invention will be pointed out with particularity in the claims annexed to and forming a part of this specification.

For a better understanding of the present invention, reference may be had to the accompanying drawings in which:

FIG. 1 is a perspective view of a test cell container embodying the features of the present invention shown used with suitable electrical measuring apparatus;

FIG. 2 is an enlarged sectional view taken along line 2—2 of FIG. 1, assuming that all of the container of FIG. 1 was showing; and FIG. 3 is a sectional view taken along line 3—3 of FIG. 2.

The above and other objects are achieved in accordance with the present invention by the provision of a portable test cell container adapted to be readily loaded and unloaded with material, such as, corn, wheat, oats, barley, rye, flour or the like, whose moisture content is to be determined (the material hereinafter being referred to as grain or the like). The container is provided with means having high thermal capacity (and heat content) disposed in thermal contact with the stored grain so that the container and the grain are brought to an equilibrium temperature which is maintained substantially constant during the testing operation. This ambient temperature, and accordingly the temperature of the grain, is measurable by thermal responsive means suspended internally of and comprising a part of the container, which means are permanently housed within the container at all times thereby obviating the need for a thermometer insertion and withdrawal operation. Once the loaded container has reached its equilibrium temperature it is manually connected to an electrical resistivity measuring apparatus. Specifically, the container is brought into electrical engagement with probes which are housed internally of the apparatus and which are electrically connected to an electrical system of the type disclosed in the copending Moore et al. application, Serial No. 859,677, filed December 15, 1959, which is a continuation of Serial No. 591,358, filed June 14, 1956, and now abandoned. In systems of this type, a current is passed through the sample and the ohmic resistance of the material is determined by an ammeter calibrated in ohmic values. Simultaneously, the temperature and resistivity of the sample are measured and the values applied to a calculator for determining the moisture content of the sample.

Considering now the drawings in detail, and in particular FIG. 1, there is illustrated in FIG. 1 the test cell container 10 loaded or filled with grain 11 and shown as used with suitable electrical measuring apparatus 12. The electrical measuring apparatus 12 includes a housing 13 for enclosing the electrical system described above and in which is defined a recess 14 for accommodating the lower end for the test cell container 10.

Briefly, the apparatus 12 and its electrical system include a range switch 15 and a battery (not shown) for electrically energizing, under the control of a variable resistor 16 for balancing or zeroing the meters, two separate resistance networks (not shown). Bullet-like probes 17 and 18 (shown in FIG. 2 only) engage the walls of the container 10 when it is disposed within the recess 14, the probe 17 being spring-biased into engagement with the side of the container. The probes are common to each of the separate resistance networks and electrically connect the cell into the electrical system regardless of the electrical range employed. A micro ammeter 19 is selectively energized by either of the separate networks and includes two range scales 19a and 19b and an indicator 19c for measuring the amount of current flow or the ohmic resistance of the sample cell 10. A calculator 20 is secured to the inside of a top cover 21 hingedly attached to the housing 13 and includes both a temperature and resistivity dial 20a and 20b by which the moisture content percentage may be readily obtained from a moisture content dial 20c.

The test cell container 10, shown in detail in FIGS. 2 and 3, is of cylindrical configuration and is adapted to store temporarily a sample or specimen of predetermined quantity of grain or the like material during both the temperature and resistivity measuirng operations. More specifically, the test cell container 10 comprises concentric outer and inner metal cylinders 30 and 31 between which is defined an annular chamber 32 for accommodating the grain 11 to be tested. The top of the chamber 32 is open to facilitate entry of the grain 11 during a filling operation and the bottom of the chamber 32 is closed by an annular ring 33 attached by suitable screws 34 to a plurality of ears depending inwardly from the outer cylinder 30. The ring 34, manufactured from suitable insulating material for a purpose described hereinafter, cooperates with a plug 35, which is in electrical contact with the inner cylinder 31, to maintain, as shown in FIG. 3, the cylinders 30 and 31 in spaced apart relation. As shown, an annular shoulder 35a and a retainer ring 36 disposed within an annular recess 35b of the plug 35 coact to fixedly secure the plug 35 to the ring 33. The upper portion of the plug 35 has a reduced diameter shank section 35c which is press fitted into the lower end of the inner cylinder 31 until the lower end 31a of the cylinder 31 seats against a shoulder 35d. Solder or plastic sealer 37 is used to seal the plug 35 to the cylinder 31.

As indicated above, the test cell container 10 is readily adapted to be inserted into and withdrawn from the electrical measuring instruments 12 in order to facilitate measurement of the resistivity of a series of samples of grain 11 within a short period of time. To this end, the inner and outer cylinder 30 and 31 form electrodes between which current is developed by the resistance networks to obtain a resistivity measurement. The cylinders 30 and 31 are made from electrical conductive materials such as, aluminum, copper, brass or steel, aluminum being preferred because of its lightness and high thermal and electrical conductivity. The outer cylinder 30, as shown in FIG. 2, directly contacts the spring biased probe 17 of the electrical measuring instruments 12. The inner electrode 31, however, as described above, is electrically connected to the plug 35, also made of electrical conducting material. The configuration of the plug 35 is such that it extends beneath the lower rim 30a of the outer cylinder to assure that the plug 35 engages the probe 18 of the electrical measuring instruments 12. Hence, the weight of the test cell container 10 is adequate to maintain a good electrical connection between the plug 35 and the probe 18, while any conventional biasing means operating on the probe 17 is able to maintain a good electrical contact between the outer cylinders 30 and the electrode 14. The inner and outer cylinders or inner or outer wall electrodes 30 and 31 are maintained in non-contacting engagement by the insulating annular ring 33 made from electrically insulating material, such as phenolic resin, hard rubber, urea-formaldehyde resins, polystyrene, and the like, thereby to prevent any shorting of the electrical circuit in the electrical measuring apparatus 12.

In accordance with a feature of the present invention, there is provided a substantially constant heat source for maintaining the grain 11 at a constant temperature during the temperature and resistivity measuring operation. More specifically, an inner chamber 40 defined by the inner cylinder 31 and the recessed plug 35 is filled with a liquid having high thermal capacity. Any liquid having a relatively high thermal capacity, such as water or a non-volatile liquid, may be used. Moreover, aqueous solutions of ethylene glycol, propylene glycol, glycerol, or the like are used. Aqueous solutions are preferred because the freezing point thereof is substantially below that of pure water and the test cell container is therefore not subject to distortion or damage when used in grain fields or in unheated storage areas in temperatures below the freezing point of water, i.e., 32 degrees F. In addition, the heat content of the liquid is much greater than that of the grain to be tested, and, since the inner cylinder 31 in addition to being electrically conductive has a high heat conductivity, the grain disposed in the chamber 32 in the test cell container 10 is rapidly brought into temperature equilibrium with the liquid in the chamber 40. By this arrangement, the temperature of the grain is therefore maintained at a substantially constant temperature during the temperature and resistivity measuring operation. It has been observed that when frozen grain is placed in the container 10, it will come to temperature equalization with the liquid within minutes, as contrasted with hours required by other moisture testing equipment.

To permit the test cell container to be moved freely or even inverted during filling or emptying of the test cell container 10 without loss of any of the liquid, a cap 42 is press fitted over the upper ends of the inner cylinder 31 until a shoulder 42a abuts against the upper ends 31b of the inner cylinder 31. A sealed, self-contained chamber 40 is thereby defined by the plug 35, the inner cylinder 31, and the cap 42. In order to provide a water-tight seal between the cap 42 and the inner cylinder 31, an O-ring 43 is disposed in a recess 42b to engage the inner surface of the inner cylinder 31. A passageway 44 defined longitudinally of the cap 42 is used for introducing or removing liquids from the chamber 40. The upper end of the passageway 44 is enlarged and is internally threaded to accommodate a screw plug 45 for closing or sealing off the passageway 44.

For the purpose of easily obtaining temperature measurement of the grain 11, and in accordance with another feature of the present invention, a bimetal thermometer 50 is introduced into the interior of the liquid chamber 40 through a central aperture 42d, defined in the plug 42. When the shank 50a of the thermometer 50 is threaded into the aperture 42d, the lower tip 50b of the thermometer 50 is slightly spaced from the bottom of the recess 35e of the plug 35 and an indicator dial 51 is seated within a recess 42c of the cap 42 in flush relationship with the top of the cap 42. The indicator dial 51 comprises an indicator 52 and a dial 53 which are enclosed by a transparent cover 54 so that the temperature of the liquid in the chamber 40 may be easily determined. It will be appreciated that after the temperature of the grain 11 and the temperature of the liquid have reached an equilibrium value, the reading on the indicator dial 51 will indicate the temperature of the grain 11 being tested. Moreover, the thermometer is permanently housed within the container so that handling a thermometer during testing of the grain and operating auxiliary temperature prior to and after a testing operation is entirely avoided.

In operation, a representative sample of grain or the like is poured to overflowing into the chamber 32 of the test cell container 10. The pouring technique eliminates uneven or unequal packing and a uniformly measured volume of grain is obtained for each measuring operation. The test cell container 10 is then swirled in order to shake off excess grain and induce circulation of the liquid for more quickly bringing the temperature of the grain and the liquid to an equilibrium point. Next, the container 10 is inserted within the recess 14 of the electrical measuring apparatus such that the probes 17 and 18 are brought into electrical contact with the electrodes 30 and 31, respectively. The on-off switch 15 is operated and the range switch 16 set in the position to read more accurately the indication of the meter 19. Then, the readings on the ammeter 19 and the thermometer 50 are observed substantially simultaneously to assure true and accurate findings. The dials 20a and 20b of the calculator 20 are then adjusted in accordance with the readings on the ammeter and the thermometer and the moisture content of the grain sample determined by reference to the moisture content dial 20c. The container 10 is then manually withdrawn from the apparatus 12 and turned upside down to discharge the sample from the container, whereby the container is readied for another testing operation.

It will be understood that the above-described test cell container 10 may be modified whereby the grain or the like material may be continuously tested instead of tested in batches or lots as in the embodiment discussed above. To this end, the container may be appropriately supported beneath a hopper having a configuration to direct the grain into the top of the chamber 32 and the cylinder electrodes may be permanently connected by suitable electrical connectors to a resistivity measuring apparatus. The annular ring 33 connecting the cylinder 30 and the plug 35 may be eliminated and radial, spaced apart supports substituted to permit the passage of the grain therebetween. In addition, baffles or gates may be employed adjacent to the bottom of the outer cylinder 30 to regulate the flow of grain to the test cell container 10 so that a constant amount of grain is at all times maintained in the container. By such modifications, the test cell container, assuming that the temperature of the grain to be tested and the liquid are substantially identical, will permit continuous measurements of the electrical resistivity of the grain passing through the test cell container and, accordingly, a continuous instantaneous determination of the moisture content of the grain passing through the container is thereby obtained.

While a particular embodiment of the invention has been shown, it will be understood, of course, that the invention is not limited thereto, since modifications as indicated above may be made, and it is, therefore, contemplated by the appended claims to cover any such modifications as fall within the true spirit and scope of the invention.

What is claimed as new and desired to be secured by Letters Patent of the United States is:

1. In apparatus for measuring the moisture content of granular material and the like of the type including an electrical measuring system, a container comprising concentric outer and inner wall electrodes between which is defined a chamber for storing said material, means including said electrodes for electrically connecting said material with said measuring system, and means located within said inner wall electrode including a substance of high thermal capacity for bringing said substance and said material to an equilibrium temperature and thereafter maintaining said material at a constant equilibrium temperature during a moisture content measuring operation, and thermal responsive means disposed internally of said container for measuring the temperature of the substance of high thermal capacity contained therein.

2. In apparatus for measuring the moisture content of granular material and the like, a container comprising an outer and an inner wall electrode between which is defined a chamber for storing said material, said inner electrode forming an inner chamber, an insulator forming a bottom of the first-mentioned chamber for isolating said wall electrodes, electrical measuring means electrically connected to said wall electrodes for measuring the moisture content of material in said first-mentioned chamber, means including a substance of high thermal capacity contained in said inner chamber for maintaining said material at an equilibrium temperature during a moisture content measuring operation, a thermal responsive means disposed within said inner chamber for measuring the temperature of said substance and said material, and means for sealing said inner chamber and for supporting said thermal responsive means in said inner chamber.

3. A test cell for use in moisture content measuring systems of the type employing an electrical circuit for measuring the resistivity of the granular material, said test cell comprising a container formed by concentric outer and inner cylindrical walls forming electrodes for connection to the electrical measuring circuit, an insulator separating and electrically isolating the walls near their lower ends, an insulating cap secured to and covering the inner wall near its upper end, a conducting cap connected to and closing the bottom end of the inner wall, said inner and outer walls and said insulator cooperating to define a chamber for the granular material, said inner wall and said insulating and conducting caps cooperating to define an enclosed fluid chamber, an aqueous solution fluid having a high thermal capacity disposed within said fluid chamber for maintaining said material at a substantially constant uniform temperature throughout, and a temperature measuring device supported from said insulating cap and extending into said fluid but readable from the exterior of the cell for indicating the temperature of the fluid and, consequently, the temperature of the granular material.

4. An apparatus for measuring the moisture content of granular material and the like of the type including an electrical measuring system, a container comprising a first wall electrode and a second wall electrode between which is defined a chamber for storing material to be tested, means including said electrodes for electrically connecting said material into said measuring system, a heat reservoir consisting solely of a substance of high thermal capacity and high heat content disposed in thermally conductive relation with the material to be tested and located within one of said electrodes, and thermal responsive means disposed for measuring the temperature of the substance of high thermal capacity and high heat content.

5. An apparatus for measuring the moisture content of granular material and the like of the type including an electrical measuring system, a container comprising a first wall electrode and a second wall electrode between which is defined a chamber for storing material to be tested, means including said electrodes for electrically connecting said material into said measuring system, means utilizing only the heat energy available from a heat reservoir consisting solely of a fixed quantity of high thermal capacity and high heat content substance disposed in thermally conductive relation with the material to be tested and sealed within the inner of said electrodes for bringing said material into an equilibrium temperature with said substance and thereafter maintaining said material at an equilibrium temperature with said substance during a moisture content measuring operation, and thermal responsive means disposed for measuring the temperature of the substance of high thermal capacity.

References Cited in the file of this patent

UNITED STATES PATENTS

| | | |
|---|---|---|
| 2,370,609 | Wilson et al. | Feb. 27, 1945 |
| 2,505,936 | Behn | May 2, 1950 |
| 2,520,394 | Franden-Lutz et al. | Aug. 29, 1950 |
| 2,567,921 | Boehm | Sept. 18, 1951 |
| 2,588,882 | Rolfson | Mar. 11, 1952 |
| 2,654,067 | Bruce | Sept. 29, 1953 |
| 2,702,948 | Seney | Mar. 1, 1955 |
| 2,755,438 | Cudmore | July 17, 1956 |

FOREIGN PATENTS

| | | |
|---|---|---|
| 110,204 | Australia | Aug. 4, 1940 |